Sept. 18, 1962     A. F. BOHNHOFF     3,054,386
BRAKE BOOSTER UNIT
Filed Feb. 13, 1959
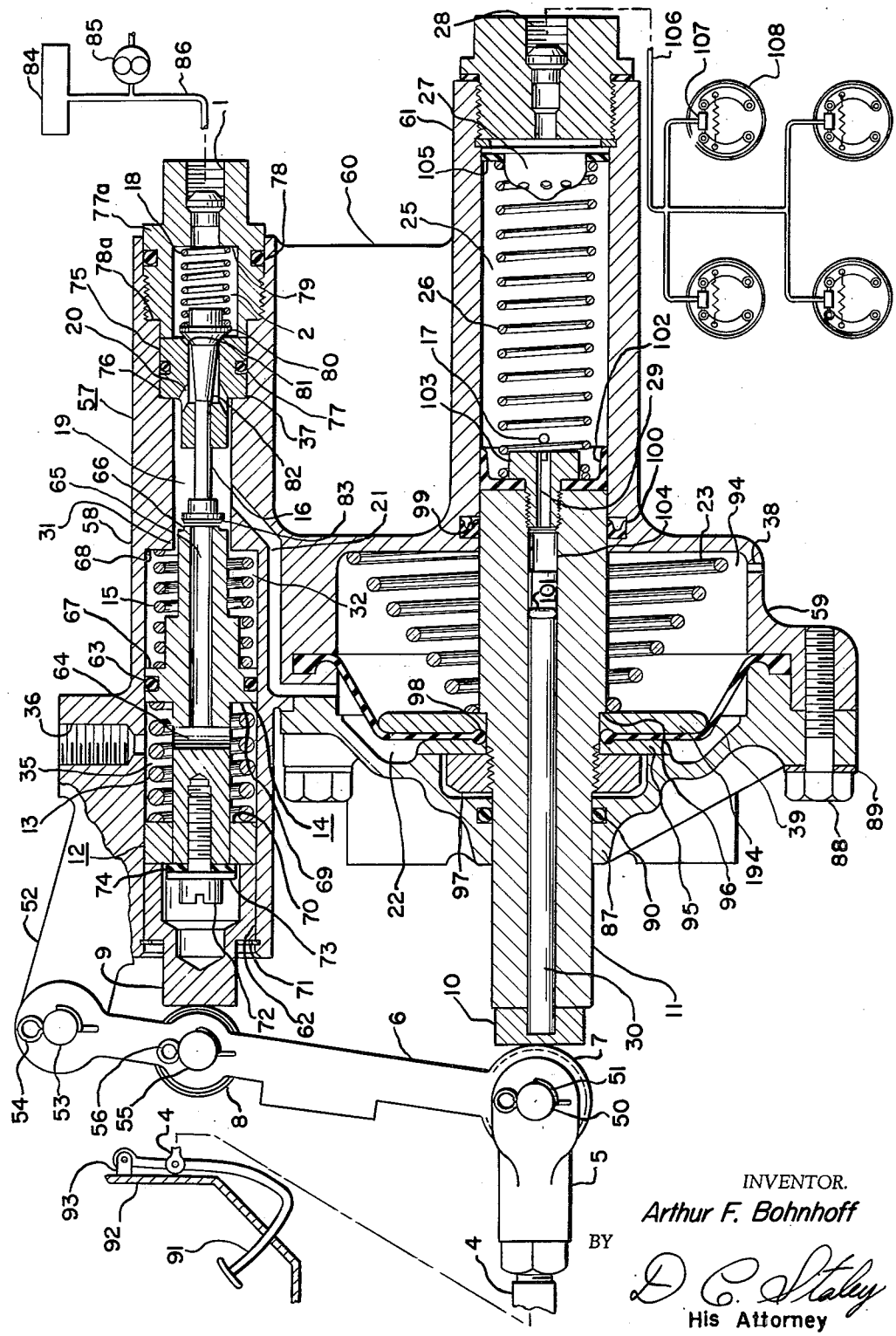
INVENTOR.
Arthur F. Bohnhoff
BY
D. C. Staley
His Attorney 3,054,386
Patented Sept. 18, 1962

3,054,386
BRAKE BOOSTER UNIT
Arthur F. Bohnhoff, Saginaw, Mich., assignor to General Motors Corporation, Detroit, Mich., a corporation of Delaware
Filed Feb. 13, 1959, Ser. No. 793,149
6 Claims. (Cl. 121—41)

This invention relates to a brake booster unit and more particularly to an air operated brake booster unit.

In the operation of a brake booster unit, it is desirable to provide a simplified means of actuating the control valves and also retain for the operator a proportional "feel" relative to the pressurized fluid within the master cylinder. This may be accomplished by means of a push rod acting directly against a pressurized fluid within the master cylinder and receiving a portion of the back pressure of the pressurized fluid within the master cylinder. The valve control means can be operated by the same lever which received a proportional back pressure of the pressurized fluid of the master cylinder. This invention is intended to accomplish these purposes.

It is an object of this invention to provide a pressurized fluid operated diaphragm booster unit and means for manual operation in event of power failure for pressurizing fluid in a hydraulic brake system.

It is another object of this invention to provide a single control means for simultaneously operating the control valves and transmitting a component of the actuating force directly to the fluid displacement member for pressurizing fluid within the fluid brake system.

It is a further object of this invention to provide a pressurized fluid operated diaphragm brake booster unit which transmits a portion of the back pressure of the pressurized fluid within the fluid displacement member to the operator of the vehicle brakes.

It is a further object of this invention to provide a diaphragm booster element with its axis spaced from the axis of valve control means.

This air operated diaphragm booster unit accomplishes the objects of this invention in the subsequently described manner. A manual brake pedal is employed to pivot a lever which operates a diaphragm booster unit and the control valves for the booster unit at the same time. The control valves, however, are not contained in axial alignment with the master cylinder, but are displaced in parallel alignment with the master cylinder. A lever containing a roller engages a reaction button on a push rod which extends into the master cylinder. A piston also engages the reaction button and encloses the push rod and extends into and operates as the master piston within the hydraulic master cylinder. The piston is provided with a diaphragm mounted on its outer periphery which forms an actuating chamber adjacent to the diaphragm member. The diaphragm is mounted on its inner periphery on this piston and on the outer periphery within a cylindrical portion to permit free movement of the piston within the diaphragm cylinder. A return spring is provided on the opposite side of the diaphragm for returning the piston to its normal retracted position.

A valve actuating button is also provided which engages a second roller on the pivoting lever. This button moves axially within the valve cylinder against the back force of two concentrically mounted springs on the valve piston. The axis of valve cylinder is displaced from the axis of master cylinder but in parallel with the master cylinder. The movement of the piston closes an exhaust valve and opens an inlet valve to the supply of air pressure. As the air pressure enters the valve cylinder, it is permitted to pass through passage means to the diaphragm actuating chamber and thereby produces an assisting force on the master piston to pressurize fluid within the master cylinder.

When the brakes are released, the return spring within the diaphragm cylinder and the spring at the forward end of the master piston return the master piston to its normally retracted position. The springs within the valve cylinder return the valve piston to a normally retracted position, thereby closing the inlet valve which is contained within the inlet passage and also opening the exhaust valve which permits the air pressure to escape through an exhaust port. The valve piston returns to its normally retracted position under the force of the valve piston springs.

Further objects and advantages of the present invention will be apparent from the following description, reference being had to the accompanying drawings wherein a preferred embodiment of the present invention is clearly shown.

In the drawings:

This invention is illustrated on a single sheet containing one view. This view discloses the cross-section of the valve actuating mechanism and the diaphragm operated booster unit in conjunction with the fluid actuating brake system, the source of air pressure, and the manual control means.

The manual brake pedal 91 is shown pivotly mounted on the fire wall 92 by means of a bracket 93. A push rod 4 is pivotally connected to the manually brake pedal 91 and also is connected to the lever 6 by means of a clevis 5 and a pin 50 and cotter key 51. This pin and key assembly, together with the clevis 5 also support a roller 7 for engaging a reaction button 10. The lever 6 is pivotly mounted on its upward end on an arm 52 by means of a pin 53 and cotter key 54. Intermediate of the mounting end and the portion receiving the roller 7 is provided a second roller 8 which is held in position by means of a pin 55 and a cotter key 56. A unitary casting forms the valve cylinder 58 and the diaphragm cylinder 59. The axis of these two cylinders are parallel and displaced from each other. Cast integral with these two cylinders is also a reservoir 60 which extends upward when the booster unit is in the horizontal position. This view is taken from the bottom side of the booster unit and perpendicular to the axis of the valve cylinder and diaphragm cylinder. The reservoir 60 has a hollow portion for storing pressurized fluid for the vehicle brake system. The reservoir port 17 is in communication with the pressurized chamber 25 with the master cylinder 61.

The valve cylinder 58 is provided with an exhaust port 36. The valve cylinder 58 is provided with an opening 62 for receiving the valve piston 14 and the valve actuating button 9. The valve piston 14 is provided with an O ring seal 63 to provide a sealing means between the piston 14 and the cylinder 58. The piston 14 also is provided with a diametrically extending passage 64 and an axially extending passage 65 which extends from the diametrically extending passages 64 to the forward end of the valve piston 14. A valve seat 66 is provided on the extreme forward end of the valve piston 14. A radial flange portion 67 which receives the O ring seal 63 has a forward planar facing with which the secondary return spring 15 is in constant contact when the piston is assembled within the cylinder 58. The secondary return spring 15 is under constant compression between the forward planar surface on the flange 67 and a similar planar surface 68 in the central portion of the valve cylinder 58.

The radial flange 67 which receives the O ring seal 63 is also provided with a planar surface 69 on the rearward side of the flange 67. The primary return spring 13 is under constant compression and bears against the planar surface 69 on its forward end and a similar planar surface 70 on a piston guide 12. The piston guide 12 is slidably mounted on the outer periphery of the rearward end of the valve piston 14. The rearward end of the piston guide 12 bears against the forward end of the valve actuating button 9. The valve actuating button 9 is retained within the inner periphery on the rearward end on the valve cylinder 58 by means of a snap ring 71.

The piston guide 12 is assembled on the rearward end of the valve piston 14 by means of a screw 72 and washer 73, together with the spacer 74.

The forward end of the valve cylinder contains a valve seat member 37. This valve seat member abuts a shoulder portion 76 at the forward end of the valve cylinder 58. A groove is provided on the outer periphery of the valve seat member 37 for receiving an O ring seal 77 which provides a sealing means on the inner periphery of the forward end of the valve cylinder 58. A fitting 77a threadedly engages the extreme forward end of the valve cylinder 58 and abuts a shoulder 78a. This fitting 77a is also provided with an O ring seal 78 which is received in an annular groove about its outer periphery.

The fitting 77a is provided with a hollow cylindrical portion on its rearward end for receiving a valve spring 18 which is mounted in a compressed position between the flange portion 79 on the central portion of the fitting 77a and the forward portion of valve member 16. The valve member 16 has a conical valve portion 80 for closing against a bevelled portion 81 on the valve seat member 37. The valve seat member 37 is also provided with passages 20 extending rearwardly and radially outward from the central passage 82 within the valve seat member 37. The rearward end of the valve member 16 is also provided with a valve portion 83 for engaging the valve seat 66 of the exhaust valve. The forward end of the valve piston 14 is shown by the forward portion 31 which is of a slightly smaller diameter than the inner periphery of the mating portion of valve cylinder 58. This loosely fitting tolerance between these two members provides an annular passage for bleeding of the pressurized air from the chamber 19 to the chamber 32 during the "holding" position of the booster unit.

The forward end of the fitting 77a is provided with a port 1 which is in communication with the conduit 86 leading to the air reservoir 84 and the air pump 85 for pressurizing fluid for the operation of the booster unit.

The pressurized fluid enters through the port 1 and chamber 2 and passages 20 leading into the chamber 19 within the valve cylinder 58. The pressurized fluid within the chamber 19 is permitted to pass through the adjoining passage 21 which leads into the actuating chamber 22 in the booster unit. The chamber 22 is formed on the inner portion of the cover plate 87. The cover plate 87 is securely fastened to the diaphragm cylinder 59 by means of the bolts 88 and washers 89. An O ring seal 90 is provided on the inner periphery of the cover plate 87 in an annular groove to provide a sealing means between the piston 11 and cover plate 87. The cover plate 87 provides a sealing means on the outer periphery of the diaphragm 39 which forms the air-tight seal on the outer periphery of the diaphragm between the chambers 22 and chamber 94. The inner periphery of the diaphragm 39 is provided with a mounting means of the annular disk 91 and the annular plate 95. The annular disk 194 abuts a shoulder portion 96 on the outer periphery of the piston 11. The disk 194 is maintained in constant contact with the shoulder 96 by means of the annular nut 97 which threadedly engages a portion on the piston 11. The annular disk 194, the annular plate 95, and the nut 97 provides a sealing means about an annular bead structure 98 on the inner periphery of diaphragm 39. The piston 11 and the inner portion of the diaphragm 39 are maintained in a normally retracted position by means of the return spring 23. The forward end of the return spring 23 bears against a radial wall on the forward end of the diaphragm cylinder 59. The forward end of the diaphragm cylinder 59 is provided with an air vent 38. This radial wall and the forward end of the diaphragm cylinder 59 is also provided with an annular groove 99 for receiving a seal member 100.

The piston 11 has a hollow central portion extending through the piston from one end to the other. This hollow central portion receives a reaction rod 30 which extends into the reaction button 10 on its rearward end and is provided with an annular seal member 101 on its forward end.

A cup seal 102 is mounted on a forward end of the piston 11 by means of a screw member 103 having a shoulder portion for maintaining the cup seal 102 in constant contact with the forward end of piston 11. The screw member 103 is provided with a passage 29 extending centrally through the screw member. The passage means 29 and the forward end of the central passage 104 provide communication with the passage 104 and the master cylinder chamber 25. The piston 11 is biased to the rearward position by means of the master cylinder return spring 26 which engages the cup seal 102 on its rearward end and an annular disk 105 on its forward end. The annular disk 105 fits on a check valve assembly 27 which controls the movement of fluid through the outlet port 28. The outlet port 28 is in communication with the passage means 106 which extends to the wheel cylinders 107 operating the vehicle brakes 108.

The air operated booster unit operates in the manner as subsequently described. As the brake pedal is depressed, force is transmitted through a linkage including the operating push rod 4, clevis 5, actuating lever 6, and rollers 7 and 8 on the reaction rod stop 10 and the valve actuating button 9, respectively. As lever 6 swings forward about pin 53, valve actuating button 9 imparts inward motion through the piston guide 12, primary spring 13, to piston 14, and compresses the secondary spring 15 until contact is made between valve seat 66 of piston 14 and valve 83, thus closing exhaust passage from cavity 65. Simultaneously, reaction button 10 imparts forward motion to the reaction rod 30, piston 11, diaphragm 39, and cup seal 102. This initial travel, however, does not create appreciable hydraulic pressure in the cavity 25 and passage 29, because reservoir port 17 is still open to reservoir 60. Continuing movement of piston 14 and valve member 16, compresses spring 18 and lifts valve 80 off the valve seat 81. This allows air under pressure in cavity 2 to meter through the passages 20, cavity 19, passage 21, into cavity 22. Pressure in this cavity will build up, overcoming springs 23 and 26 and force the power piston diaphragm 39, and consequently the piston rod 11 and cup seal 102 forwardly closing off reservoir port 17 and building a hydraulic pressure in cavity 25 and passage 29. This pressure will overcome the two-way check valve 27 and flow through port 28 into the brake lines to the brake cylinders. At the same time, this pressure will act on reaction rod 30, forcing it outward against roller 7, which creates a "feel" reaction on push rod 4.

To hold the brake on, air in cavities 19 and 22 is permitted to enter cavity 32 by bleeding through annulus 31. When the air pressure build-up overcomes the mechanical force of spring 13, piston 14 reacts, permitting the valve 80 to reseat on valve seat 81. The return travel of piston 14, however, is not enough to open the exhaust valve 83 from valve seat 66 to the passage 65, 64 and the exhaust port 36. The seating of valve 80 on valve seat 81 prevents additional air being delivered to the cavity 22, and at the same time, prevents air already delivered from escaping through the exhaust valve 83 and valve seat 66, hence the brake is held in the applied position. Should the brake pedal be depressed further, the piston 14 again moves inward, forcing the valve 80 off seat 81, thus increasing the pressure in chamber 22. If the brake pedal is partially released, the mechanical force of spring 13 is reduced. Hence, the air pressure in cavities 32 and 19, acting on position 14, will overcome spring 13, permitting piston 14 to retract, thus closing inlet valve 80 on valve seat 81 and opening exhaust valve 83 from valve seat 66, permitting the air in cavity 22 to escape through the passages 65, 64 and cavity 35 through the exhaust port 36 when the air pressure again balances the force of spring 13, the piston 14 moves inward closing the valve 16, trapping the remaining air.

When the brake pedal is fully released, the lever 6 returns to its normal retracted position, thereby releasing the piston 14 which closes inlet valve 81 on valve seat 80 and opens exhaust valve 83 from valve seat 66. All of the air in cavity 22 is released, allowing it to flow through passages 65, 64 and cavity 35, to the exhaust port 36. Simultaneously, the piston rod 11 and cup seal 102 return to the released position, thereby reducing the hydraulic pressure in cavity 25 to passage 29. This allows pressure in the brake lines to flow back through the check valve 27, into the cavity 25, and through the reservoir port 17, into the reservoir 60.

The booster unit will operate manually in event of power failure. The manual operation would be as follows: As the pedal 91 is depressed, the push rod 4 moves forward, as the lever 6 pivots forwardly forcing the reaction button 10 against the piston 11 carrying the piston forward. The valve mechanism within the valve cylinder operates through the same mechanical movement although no power is received from the inlet port 1. This also means that no pressurized fluid is received within the actuating chamber 22. The diaphragm 39 and piston 11 move forward under the manual force applied on the brake pedal 91.

The fluid within the master cylinder chamber 25 is pressurized and thereby actuating the four-wheel brakes 108. The full reaction of the pressurized fluid within the master chamber 25 is felt by the operator. During the manual operation, a greater force is required on the brake pedal 91 than when the booster unit is operated with the assisting force of pressurized fluid in the operating chamber 22 behind the diaphragm 39. The operation solely from manual force is not as satisfactory as when the booster unit is assisting the brake operation, but it does provide a measure of safety which is necessary for positive operation of the vehicle brakes.

It is further pointed out that during manual operation the full reaction of the pressurized fluid within the master cylinder chamber 25 is felt directly by the operator. This, however, is not true when the booster unit is operating under power from the pressurized fluid in the actuating chamber 22. At this time, the pressurized fluid within the chamber 22 forces on the rearward side of the diaphragm carrying the piston forward to pressurize fluid within a master cylinder chamber 25. The pressurized fluid in chamber 25 actuates the vehicle brakes through port 28 and conduit 106. A portion of the pressurized fluid creates a reaction through the opening 29 of screw member 103 which is in communication with the hollow cylindrical opening 104 within the piston 11. The pressure at this point acts against the forward side of the reaction rod 30. This pressure is transmitted as a force through the reaction rod 30 and is received in the reaction button 10. The reaction button 10 being in contact with the roller 7 creates a true proportionate "feel" to the operator when the vehicle brakes are actuated. The "feel" being proportionate to the pressure within the master cylinder chamber 25 is desirable in that the operator of the vehicle brakes has a true indication of the extent to which the brakes are being operated.

While the embodiment of the present invention as herein disclosed constitutes a preferred form, it is to be understood that other forms might be adopted.

What is claimed is as follows:

1. Valve means for use in an expansible fluid power unit forming an actuating chamber, said valve means having an axis other than the axis of said power unit and comprising in combination, manual means for operating said power unit and said valve means, pressurized fluid inlet passage means in said valve means in communication with said actuating chamber, an inlet valve mounted within said inlet passage means normally biased to a closed position, means forming an exhaust passage means in communication with said inlet passage means, an exhaust valve in said exhaust passage means normally biased to an open position and including an exhaust valve piston having a central opening formed therein and a valve cylinder receiving said piston and an exhaust valve seat formed on said exhaust valve piston and an exhaust valve element operating in cooperation with said exhaust valve seat, first resilient means biasing said exhaust valve seat to a closed position with said exhaust valve element and connecting said manual means with said exhaust piston, second resilient means biasing said exhaust valve piston and said exhaust valve seat in spaced relation to said exhaust valve element, a pressure delay chamber formed by said exhaust valve piston and said valve cylinder receiving said second resilient means, said exhaust valve piston and said valve cylinder forming a restricted opening to permit equalization of pressure in said pressure delay chamber relative to said inlet passage means causing an increase in pressure and permitting the pressurized fluid to bias said valve piston to allow said inlet valve to close while retaining said exhaust valve means in a closed position when said booster unit is in the hold position.

2. Valve means for use in an expansible fluid power unit having a power wall and forming an actuating chamber and comprising in combination, manual means for operating said valve means, a valve cylinder axially parallel to said power unit, inlet passage means in said valve cylinder in communication with said power unit actuating chamber, an inlet valve seat formed on the inner periphery in said valve cylinder inlet passage means, a valve member forming an inlet valve element normally biased to a closed position with said inlet valve seat, an exhaust valve piston, exhaust passage means in said valve cylinder and formed through said exhaust valve piston in communication with said inlet passage means, an exhaust valve seat formed on the end adjacent the inlet passage means on said exhaust valve piston, an exhaust valve element formed on said valve member engaging said exhaust valve seat, a first spring biasing said exhaust valve piston toward said exhaust valve element and connecting said manual means with said exhaust piston permitting relative movement of said manual means and said piston during operation, a second spring normally biasing said exhaust valve piston to a position in spaced relation to said exhaust valve element, a pressure delay chamber receiving said second spring formed by the inner periphery of the valve cylinder and the outer periphery of said exhaust valve piston, said exhaust valve piston and the inner periphery of said valve cylinder forming restricted passage means to permit equalization of pressure in said inlet passage means with said pressure delay chamber and permit reseating of said inlet valve element with said inlet valve seat when said booster unit is in the hold position.

3. Valve means for use in an expansible fluid power unit having a power chamber and having an axis other than the axis of said power unit and comprising in combination, manual control means, a valve cylinder forming an inlet passage means in communication with said power chamber, an inlet valve seat formed on said valve cylinder, a valve member forming an inlet valve element, inlet valve reseating means biasing said inlet valve element to a normally closed position with said inlet valve seat, an exhaust valve piston concentrically mounted within said valve cylinder, exhaust passage means in communication with said inlet passage means, and having a portion thereof formed in said valve piston, an exhaust valve element formed on said valve member, an exhaust valve seat formed on said exhaust valve piston for cooperation with said exhaust valve element, means for actuating said valve means and said power unit, a first spring connecting said valve actuating means with said exhaust piston and transmitting an actuating force from said valve actuating means to said exhaust valve piston, a second spring normally biasing said exhaust valve seat in spaced relation to said exhaust valve element, a pressure delay chamber formed by the inner periphery of said valve cylinder and the outer periphery of said exhaust valve piston, and restricted passage means formed by the inner periphery of a shouldered portion of said valve cylinder and the outer periphery of said exhaust valve piston to permit equalization of pressure in said pressure delay chamber with said inlet passage means to control the pressure permitting reseating of the inlet valve element on the inlet valve seat by said inlet valve reseating means when said booster is in the hold position.

4. A gaseous fluid brake booster unit comprising in combination, manual means for controlling the operation of said brake booster unit through a valve assembly, said valve assembly including valve housing means having an inlet port and an exhaust port, an exhaust piston, said valve housing means provided with a cylindrical opening receiving said exhaust piston for reciprocal movement therein, button means contacting said manual control means, first resilient means contacting said button means and said piston biasing said piston to a forward position, second resilient means operating within a delayed pressure chamber biasing said piston to a rearward position, said delayed pressure chamber formed by said valve housing means and said exhaust piston, exhaust valve means engageable with said exhaust piston, exhaust passage means within said exhaust piston extending from said exhaust valve means to a point adjacent to said exhaust port in said housing means, inlet passage means in said valve housing from said inlet port and communicating with an actuating chamber in the booster unit, inlet valve means contained in said inlet passage means, said inlet valve means normally biased to a closed position to prevent the passage of a pressurized fluid within said inlet passage means, said inlet passage means having limited communication with said delayed pressure chamber by means of a limited opening defined by the outer periphery of the forward end of said exhaust piston and the adjacent inner periphery of said valve housing cylindrical opening to permit pressure equalization in said pressure delay chamber with said inlet passage means to bias said exhaust piston in such a manner to permit the inlet valve to close when the booster is in the hold position.

5. A gaseous fluid operated brake booster unit comprising in combination, manual means for controlling the operating of said brake booster unit, a fluid actuating chamber formed in said booster unit, a valve assembly including valve housing means, having an inlet port and an exhaust port, inlet passage means communicating with said inlet port and in communication with said booster unit actuating chamber, inlet valve means in said valve housing means normally biased to a closed position, an exhaust piston, a cylindrical opening in said valve housing for receiving said exhaust piston, first resilient means within said valve housing means connecting said exhaust piston with said manual means to permit forward movement of said manual means relative to said piston, second resilient means biasing said exhaust piston to a rearward position thereby providing an axial floating condition of said exhaust piston in said valve housing means, a pressure delay chamber formed by said exhaust piston and said valve housing means receiving said first resilient means, a loosely fitted annulus on the outer periphery of the forward end of said exhaust piston and a mating inner periphery of the valve housing connecting said delay chamber with said inlet passage to provide relative movement of said exhaust piston relative to said valve housing means as the pressurized fluid in said inlet passage means equalizes with the pressure within said pressure delay chamber thereby permitting said inlet valve means to close when the booster unit is in the hold position.

6. A pressurized fluid operated brake booster unit having an actuating chamber and comprising in combination, manual control means for operating said brake booster unit, a valve assembly having an axis displaced from the axis of said booster unit and including valve housing means having a pressurized fluid inlet port and a pressurized fluid exhaust port, inlet passage means communicating with said inlet port and said actuating chamber, inlet valve means normally biased to a closed position and received in said inlet passage means, exhaust passage means in communication with said exhaust port and said actuating chamber, exhaust valve means in said exhaust passage means, said valve housing means having a cylindrical opening receiving a reciprocating exhaust piston, said exhaust piston within said valve housing having means contacting said manual control means, resilient means within said valve housing means biasing said exhaust piston to a rearward position, resilient means connecting said exhaust piston to said manual control means biasing said piston to a forward position thereby providing a floating condition for said exhaust piston in said valve housing means, a pressure delay chamber formed by said exhaust piston and said valve housing means receiving said rearwardly biasing resilient means, said pressure delay chamber being in limited communication with said inlet passage means through a loosely fitted annulus on the outer periphery of the forward end of said exhaust piston and a mating inner periphery of said valve housing to permit pressurized fluid in said inlet passage means to equalize with pressurized fluid in said pressure delay chamber, thereby permitting said inlet valve means to close and said exhaust valve means to close when said booster unit is in the hold position.

References Cited in the file of this patent
UNITED STATES PATENTS

| | | |
|---|---|---|
| 2,229,247 | Kamenarovic | Jan. 21, 1941 |
| 2,241,374 | Alfieri | May 13, 1941 |
| 2,746,255 | Fitch et al. | May 22, 1956 |
| 2,761,427 | Shumaker | Sept. 4, 1956 |
| 2,770,949 | Randol | Nov. 20, 1956 |
| 2,807,239 | Grant | Sept. 24, 1957 |
| 2,902,829 | Verbrugge | Sept. 8, 1959 |
| 2,925,805 | Schultz | Feb. 23, 1960 |

FOREIGN PATENTS

| | | |
|---|---|---|
| 640,542 | Great Britain | July 19, 1950 |
| 494,939 | Belgium | Aug. 1, 1950 |
| 830,004 | Germany | Jan. 31, 1952 |
| 1,006,737 | Germany | Apr. 18, 1957 |
| 302,354 | Switzerland | Dec. 16, 1954 |